Figure 8:
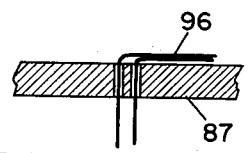

Feb. 25, 1964  R. C. REMPEL ETAL  3,122,703
GYROMAGNETIC RESONANCE METHOD AND APPARATUS
Filed Dec. 21, 1959  2 Sheets-Sheet 1
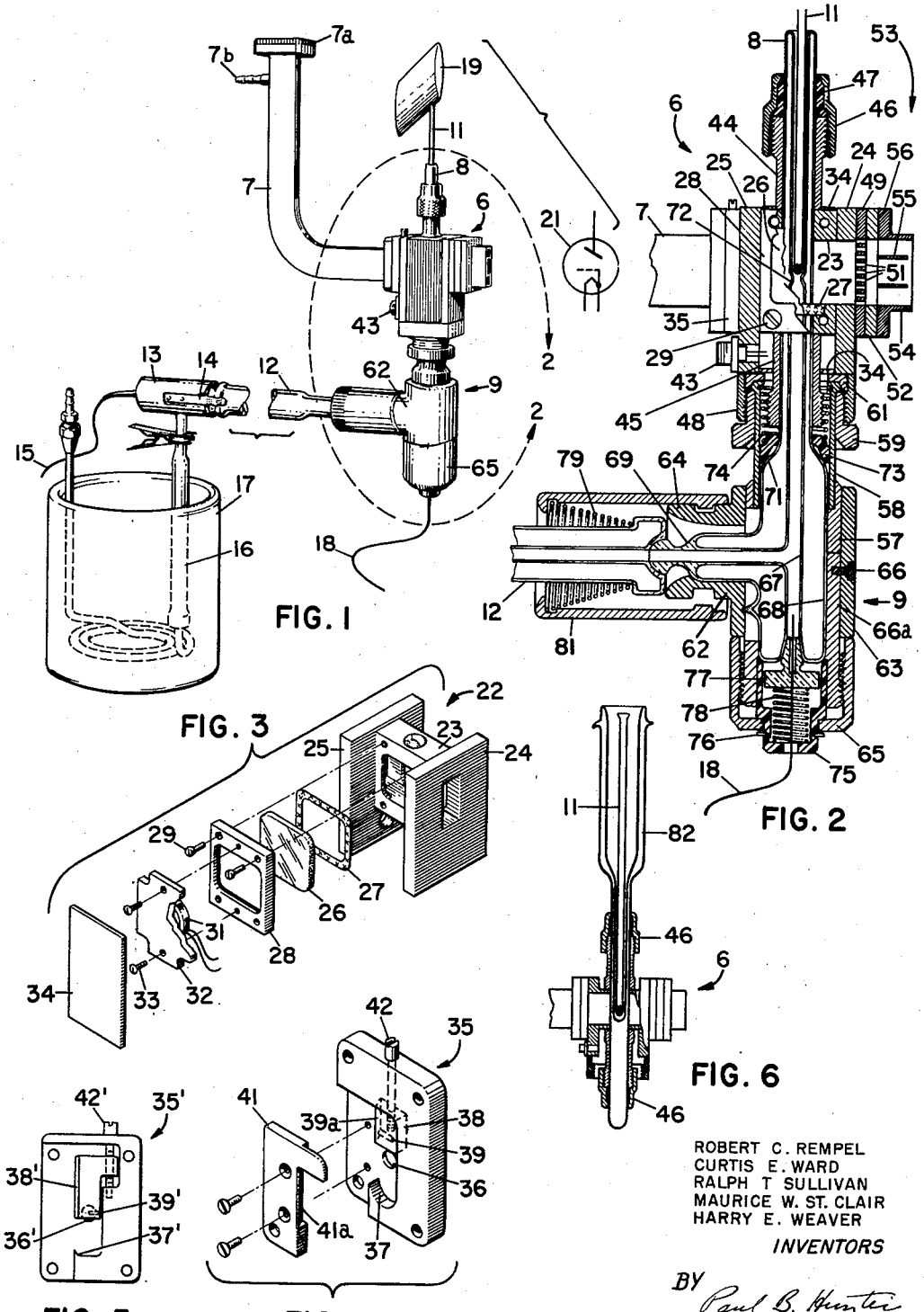
ROBERT C. REMPEL
CURTIS E. WARD
RALPH T SULLIVAN
MAURICE W. ST. CLAIR
HARRY E. WEAVER
INVENTORS
BY
Paul B. Hunter
ATTORNEY Feb. 25, 1964

R. C. REMPEL ETAL 3,122,703

GYROMAGNETIC RESONANCE METHOD AND APPARATUS

Filed Dec. 21, 1959

2 Sheets-Sheet 2

ROBERT C. REMPEL
CURTIS E. WARD
RALPH T. SULLIVAN
MAURICE W. ST. CLAIR
HARRY E WEAVER

INVENTORS

BY Paul B. Hunter

ATTORNEY

United States Patent Office 3,122,703
Patented Feb. 25, 1964

3,122,703
GYROMAGNETIC RESONANCE METHOD AND APPARATUS
Robert C. Rempel, Curtis E. Ward, and Ralph T. Sullivan, Los Altos, and Maurice W. St. Clair, Palo Alto, Calif., and Harry E. Weaver, Zurich, Switzerland, assignors to Varian Associates, Palo Alto, Calif., a corporation of California
Filed Dec. 21, 1959, Ser. No. 860,861
19 Claims. (Cl. 324—.5)

The present invention relates in general to gyromagnetic resonance apparatus and more particularly to a novel cavity resonator and apparatus for controlling the temperature of the sample under analysis positioned within the cavity resonator.

In electron paramagnetic resonance study the sample of matter under analysis is placed in a cavity resonator located in a homogeneous magnetic field which is provided with a small modulation. This modulation can be provided by sweep coils whose axis is aligned with the strong magnetic field and conveniently located on the sides of the cavity resonator. Cavity resonators of the type illustrated here have an extremely high Q as, for example, on the order of 6000 to 8000.

Since the output signal-to-noise ratio of an electron paramagnetic resonance spectrometer increases approximately as the square root of the field modulation frequency, field modulation systems employing modulation frequencies on the order of 100 kc. are useful for great sensitivity. When a modulation frequency this great is employed, extreme difficulty is encountered in building a structurally sound cavity resonator which does not exhibit magnetic effects tending to destroy the sensitivity of the apparatus and also does not buck out the modulating magnetic field by eddy currents in the walls thereof.

Also, in gyromagnetic resonance study it is often desirable to observe the gyromagnetic resonance of a sample at a temperature other than room temperature since many solid substances can be melted without decomposition and thereby be more easily analyzed. Also if a sample is observed over a variable temperature range, it is possible to observe changes in free radical decay rates. Furthermore, chemical reactions which one desires to observe often proceed at much more convenient rates for kinetic studies when the temperature is lowered, and the change of reaction rates with reduced temperatures permits evaluation of activation energies. Also, in many instances, free radicals in a sample can be stabilized at low temperatures. In many cases it is desirable to operate the experiment with the sample at an elevated temperature. For these reasons it is desirable to utilize the novel temperature controlling apparatus of the present invention in the electron paramagnetic resonance spectrometers now in use in this field.

Since the samples which are being analyzed in electron paramagnetic resonance spectrometers are necessarily small in size in order to conserve the amount of sample that is used and because of the dielectric loss introduced into the cavity by the sample, it is preferable that only the temperature of the sample itself be controlled rather than the relatively large cavity resonator structure in which the sample is positioned within the magnetic field. Also, it is desirable to provide a cavity resonator which permits irradiation of the temperature controlled sample with ultraviolet or visible light in studying photochemical reactions and their kinetics.

Furthermore, when cavity resonator apparatus between the poles of a magnet is provided with means for controlling the temperature of the sample, it is difficult to adjust the iris coupling into the cavity by means of the conventional iris screw on the side of the cavity resonator.

The performance of previous metallic iris screw assemblies has been hampered by the difficulty in avoiding intermittent contacts between the metal parts.

Frequently, the sample cavity is positioned between the poles of a rotatable electromagnet, and under such circumstances the axis of the sweep coils is coaxially aligned with the axis of the pole pieces of the magnet. Typical rotatable electromagnets are constructed with the axis of the poles arranged horizontally and with the poles rotatable about a vertical axis midway between the pole pieces. Under such an arrangement the magnitude of the modulating sweep field along the magnet pole axis will vary as the cosine of the angle between the magnet pole axis and the sweep coil axis. Thus, if the magnet is rotated about its vertical axis, the component of the sweep field along the direction of the magnet pole axis will not maintain a constant magnitude.

The principal object of the present invention is to provide a novel cavity resonator apparatus and affiliated parts which shield the microwave magnetic field from external magnetic effects and prevent buck out of the modulating sweep field.

One feature of the present invention is a novel cavity resonator apparatus with walls of a material with a high resistivity on the sides of the cavity resonator at which the sweep coils are positioned and a layer of up to several skin depths of a diamagnetic metal of low resistivity covering the interior surface of these walls whereby eddy currents in these walls are arrested and the cavity resonator is provided with a high Q and shields microwave magnetic fields created therewithin from magnetic materials other than a sample placed therewithin.

Another feature of the present invention is a novel cavity resonator apparatus of the aforementioned feature wherein the walls of material with high resistivity are detachable from the remainder of the cavity resonator apparatus and corrugated non-magnetic metallic gaskets provide electrical contact between the detachable walls and the remainder of the cavity resonator apparatus.

Another feature of the present invention is the provision of a novel cavity resonator apparatus which comprises a stainless steel shell plated on its inner surface with a resistive non-ferromagnetic material and a layer of silver plated over said resistive non-ferromagnetic material whereby the microwave magnetic field within said resonator is shielded from the magnetic effects of said shell without substantially reducing the strength of the modulating magnetic field.

Another feature of the present invention is the provision of a cavity resonator apparatus provided with means for positioning a sample therein including waveguide communicating with the interior of the cavity resonator and having a cutoff frequency beyond the frequency of said cavity resonator thereby minimizing the loss of microwave energy from the resonator.

Another feature of the present invention is the provision of a novel cavity resonator apparatus including a vertical non-contacting coupling rod assembly for optimizing the coupling between the waveguide transmission line and the cavity resonator apparatus, said coupling rod assembly including a block of dielectric material adapted to slide across the coupling opening, a coupling rod embedded in said block and aligned transversely of the coupling opening, and actuating means for moving said block and thus said coupling rod across the coupling opening.

Another feature of the present invention is the provision of a novel cavity resonator apparatus wherein a wall of the cavity resonator is provided with a plurality of spaced bars aligned parallel to the paths of current flow within the cavity resonator providing access to the cavity between said spaced bars whereby a sample under analysis within the resonator can be irradiated by a light source outside the resonator without dissipating energy from a microwave field within the resonator.

Another feature of the present invention is the provision of a novel cavity resonator apparatus with a wall of said cavity resonator provided with a plurality of spaced bars aligned parallel to the paths of current flow within the cavity resonator providing access to the cavity between said spaced bars and with waveguide means projecting outwardly from around said spaced bars and subdivided into a plurality of open ended chambers each of which communicates with the interior of the cavity resonator through a number of the spaces between the bars and each such chamber having a cutoff frequency beyond the frequency of the cavity resonator whereby a sample under analysis within the cavity resonator can be irradiated by a light source outside the cavity resonator without dissipating energy from the microwave field within the cavity resonator.

Another feature of the present invention is the provision of a novel cavity resonator apparatus for use in a gyromagnetic resonance spectrometer device which comprises a cavity resonator with means for mounting tubular structure therein, a first tube adapted to contain a sample of matter, and a second tube with a mounting portion thereof adapted for mounting within said cavity resonator, said second tube being adapted to hold said first tube therewithin for positioning the sample at the region of maximum magnetic field within said cavity resonator and adapted to contain a fluid therein surrounding said first tube whereby the sample can be positioned within said cavity resonator and the temperature thereof controlled by the temperature of the fluid contained by said second tube.

Another feature of the present invention is the provision of a novel cavity resonator apparatus of the above featured type provided with waveguide means for propagating microwave energy into said cavity resonator and means for introducing a slow flow of dry gas into said waveguide means and thus into said cavity resonator thereby preventing moisture condensation on refrigerated portions of the novel cavity resonator apparatus during low temperature operation of the spectrometer device.

Still another feature of the present invention is the provision of a novel cavity resonator apparatus for use in a gyromagnetic resonance spectrometer device which comprises a cavity resonator with means for mounting tubular structure therein; a sample tube adapted to contain a sample of matter; and a double cylinder tube structure with a mounting portion thereof adapted for mounting within said cavity resonator, said structure including an insulating space between the cylinders, means for supporting said sample tube concentrically within the inner cylinder tube, and communicating means for directing a flowing fluid through the inner cylinder tube of said structure and around said sample tube whereby said mounting portion of said structure can be mounted in said cavity resonator with the sample positioned therewithin in the region of maximum magnetic field and the temperature of the sample can be accurately controlled by the flowing fluid.

Still another feature of the present invention is the provision of a novel cavity resonator apparatus employing a rotating sweep field whereby the component of the sweep field along the direction of the magnet axis will always remain a constant magnitude.

Still another feature of the present invention is the method of making a cavity resonator comprising the steps of fabricating a cavity resonator shell with the walls through which the modulating magnetic field passes of a material with a high resistivity and then plating the interior surface of the fabricated shell with up to several skin depths of a diamagnetic material of low resistivity thereby providing a cavity resonator which shields the microwave magnetic field therein from the effect of magnetic materials other than the sample, which has a high Q and which prevents reduction of the modulating magnetic field by eddy currents in the walls thereof.

Figure 9:
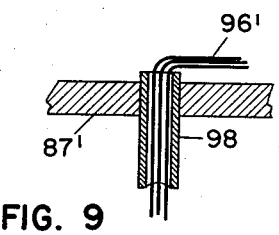
Figure 7:
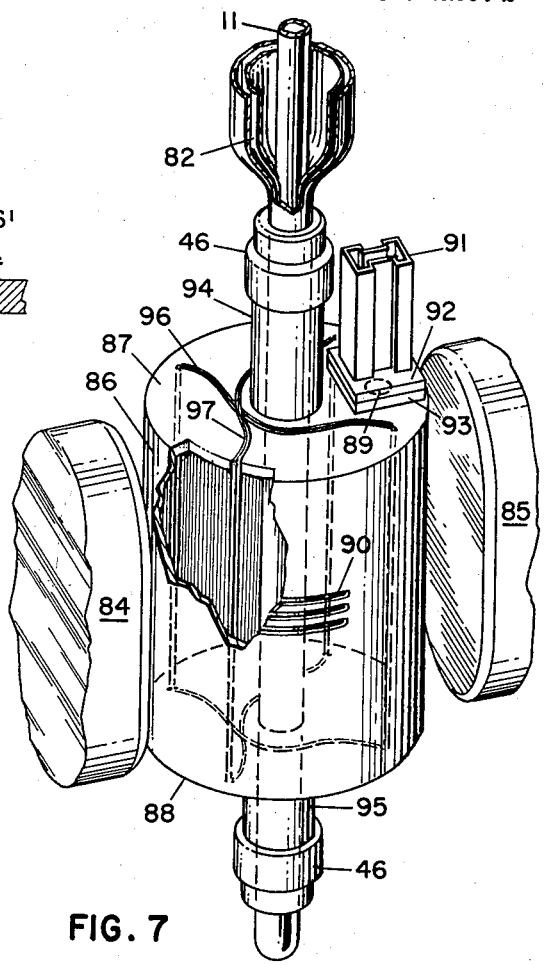
Figure 11:
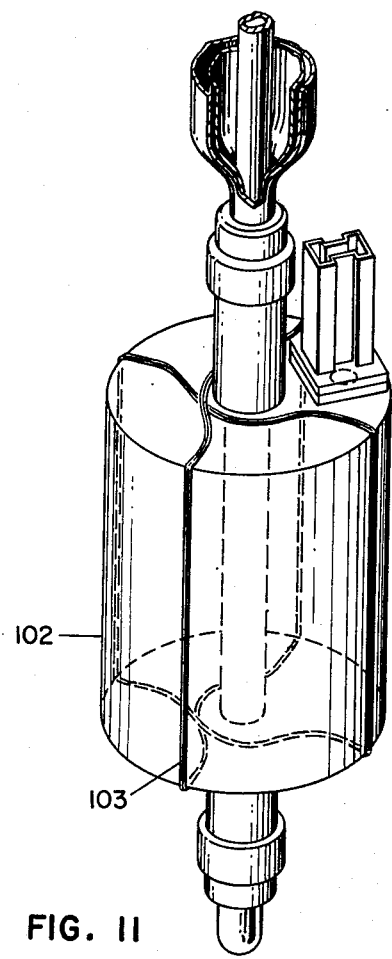
Figure 10:
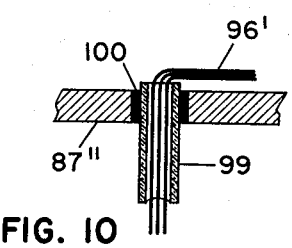

Other features and advantages of the present invention will become apparent upon a perusal of the specification taken in connection with the accompanying drawings wherein, FIG. 1 is a perspective view of one embodiment of the novel cavity resonator apparatus of the present invention showing the variable temperature means of controlling the temperature of the sample and the irradiation means for irradiating the sample, FIG. 2 is an enlarged side view partially in cross section and partially in elevation of the apparatus shown in FIG. 1 delineated by line 2—2, FIG. 3 is an exploded view of the parts enclosing one side of the cavity in the cavity resonator apparatus shown in FIGS. 1 and 2, FIG. 4 is an enlarged exploded view of the non-contacting coupling rod assembly of the cavity resonator apparatus shown in FIGS. 1 and 2, FIG. 5 is a plan view of an alternative embodiment of the iris coupling rod assembly of FIG. 4, FIG. 6 is a side view in cross section of another embodiment of the present invention showing the fixed temperature means for controlling the temperature of the sample, FIG. 7 is a perspective view of a further embodiment of the present invention utilizing a rotating sweep field, FIG. 8 is an enlarged side view in cross section of the apparatus shown in FIG. 7 taken along line 8—8 in the direction of the arrows, FIG. 9 is a cross section view of an alternative embodiment of the structure shown in FIG. 8, FIG. 10 is a cross section view of still another alternative embodiment of the structure shown in FIG. 8, and FIG. 11 is a perspective view of still another embodiment of the present invention utilizing a rotating sweep field.

Referring now to FIG. 1 there is shown an electron paramagnetic resonance cavity resonator 6 commonly referred to as a "cavity" and the affiliated parts therefor which are adapted to be inserted between the pole faces of a large permanent or electromagnet in accordance with the functioning of an electron paramagnetic resonance spectrometer. Since these spectrometers are well known in the art no complete description as to their operation will be attempted here but only so much of the operation needed to describe the invention herein disclosed will be described.

Microwave energy is propagated into the cavity 6 through a standard rectangular waveguide 7 of, for example, brass, and the waveguide 7 is bent upwardly from its connection with the cavity 6 to facilitate connection of the top end of waveguide 7 to other elements of the microwave system out from between the poles of the magnet where cavity 6 is located. The top end of waveguide 7 is covered with a thin pressure gasket 7a of, for example, Mylar preventing the flow of gas out of the waveguide 7 and providing a break in the waveguide system to the high frequency currents of the sweep coils provided for the cavity as described below. The waveguide 7 is also provided with a hose barb 7b to introduce dry gas into the waveguide 7 and thence into the cavity 6 for preventing moisture condensation on the refrigerated surfaces within cavity 6 during low temperature operation of the cavity resonator apparatus. Variable temperature means for controlling the temperature of the sample placed within cavity 6 includes a Dewar tube structure 8 a portion of which projects through the cavity 6 and out the top thereof, the lower portion of the Dewar tube structure 8 being supported by a Dewar housing 9. A quartz sample tube 11 containing the sample for analysis is inserted in the top of Dewar tube structure 8 and positioned thereby within cavity 6 as fully described below.

A Dewar transfer tube 12 is connected at one end to the lower portion of the Dewar tube structure 8 and is provided with a heating element held within its other end by a Dewar type cap member 13 which carries spring clips 14 engaging an outwardly projecting ridge on the transfer tube 12. The heating element is connected by leads 15 to a heater control unit (not shown). The transfer tube 12 communicates through the cap member 13 with a heat exchanger coil 16 placed within a heat exchanger Dewar beaker 17 adapted to contain a refrigerating liquid.

Gas as, for example, nitrogen or dry air under slight pressure is passed through the heat exchanger coil 16, through the transfer tube 12, through the Dewar tube structure 8 and around the sample tube 11. In this manner, the temperature of a sample under analysis can be controlled for temperatures ranging from that of liquid nitrogen to approximately 300° C. when liquid nitrogen is used as the refrigerant in the heat exchanger beaker 17 to achieve the temperatures at the low end of the range. The temperature can be controlled over an even wider range if a different refrigerant is used and if a different material is used in place of Teflon as described herein since Teflon decomposes at temperatures near 300° C. The heater element in cap member 13 is operated in conjunction with the heater control unit and a copper-constantan thermocouple wire 18, positioned as described below, to control the temperature of gas passing through transfer tube 12. A sample tube counter weight 19 is placed upon the top of the sample tube 11 to prevent the sample tube from vibrating or blowing out due to the flow of gas thereabout. The transfer tube 12 and all the portions of the Dewar tube structure which are outside the cavity 6 when the sample is positioned therein are silvered for temperature stability.

An irradiation source 21 as, for example, an ultraviolet light located outside cavity 6 is provided for irradiation of the sample positioned within the cavity 6 by means of open spaces in one end of the cavity 6 as further described below.

Referring now to FIGS. 2 and 3, the main body structure of cavity 6 includes a milled block 22 of, for example, brass, providing a rectangular waveguide 23 with rectangular openings in its two sides and a front and a back flange, 24 and 25 respectively, projecting outwardly from opposite ends of waveguide 23. Side walls 26 of a material with a high resistivity as, for example, ceramic cover the openings in the sides of waveguide 23, and a corrugated gasket 27 of a diamagnetic material with a low resistivity as, for example, silver provides good electrical contact between the interior surfaces of side walls 26 and waveguide 23 each of which is plated as described in detail below. Gasket 27 is corrugated by pressing a 1 mil layer of foil between a 100 mesh screen and a piece of rubber thereby producing a gasket 6–8 mils thick. Each side wall 26 is clamped in place by a hollow rectangular pressure plate 28 which is screwed to the block 22 by screws 29 threading into tapped holes in block 22.

Sweep coils 31 adjacent each side wall 26 provide the modulating sweep field for the electron paramagnetic resonance experiment. Each of the sweep coils 31 is cemented to an insulator plate 32 as of, for example, linen based phenolic, and the insulator plate 32 is screwed to the pressure plate 28 by screws 33 threading into tapped holes in pressure plate 28, insulator plate 32 being cut out to receive the heads of the screws 29 which project above the pressure plate 28. When the insulator plate 32 is screwed in place, the sweep coils 31 are spaced from the side walls 26 and the pressure plate 28 which acts as a shield to confine the modulating sweep field therewithin. Also, by providing that the sweep coils 31 do not touch the side walls 26, vibration of the sweep coils 26 is not transmitted directly to the side walls 26. Outside jacket plates 34 of, for example, aluminum extend across the top and bottom and down the length of each side of the cavity 6 between flanges 24 and 25.

The coupling flange of waveguide 7 is screwed to the back flange 25, and a rectangular, coupling assembly plate 35 is positioned between the back flange 25 and the coupling flange on the end of the waveguide 7. The coupling assembly plate 35 (see FIG. 4) is provided with circular coupling opening 36 therethrough and an elongated milled recess 37 surrounding the coupling opening 36 in the side of the plate 35 abutting the coupling flange of the waveguide 7. A dielectric coupling adjusting block 38 as of, for example, Teflon, slidably fits within recess 37 and is provided with a coupling rod 39 embedded therein and aligned transversely of the coupling opening 36. A removable cover plate 41 covers a portion of one side of the plate 35, being flush with the surface thereof, and is provided with a projection extending over coupling adjusting block 38 thereby confining the block 38 within the recess 37. The coupling adjusting block 38 is also provided with a beveled shoulder 38a and the cover plate 41 with a mating beveled shoulder 41a for confining the block 38 within the recess 37. An actuating screw 42 of, for example, nylon is rotatably captured in an aperture through the plate 35 vertically aligned with a vertical diameter of the opening 36 and is provided with threads on the inner end thereof adapted to be engaged in a tapped aperture through the coupling adjusting block 38. By rotation of the actuating screw 42 easily accessible at the top of the cavity 6, the coupling adjusting block 38 and thus the coupling rod 39 can be moved with respect to the opening 36 in the direction of the H-field in the cavity resonator. Alternatively, as shown in FIG. 5 the actuating screw 42' can be vertically positioned in the plate 35' off to the side of a vertical diameter of the opening 36 in which case both the recess 37' and the coupling adjusting block 38' would project sideways in order for the actuating screw 42' to engage the coupling adjusting block 38'. A non-contacting coupling rod assembly as described herein avoids the difficulty of intermittent contact encountered by metallic screw assemblies.

Below the iris plate 35 (see FIG. 2) an aperture is provided in the back flange 25 into which a sweep coil connector 43 is inserted for connecting the leads from the sets of sweep coils 31 to a sweep generator not shown.

An upper and a lower vertical hollow, cylindrical brass stack 44 and 45, respectively, surround apertures in the top and bottom, respectively, of the waveguide 23 of the block 22 and project through the top and bottom jacket plates 34 whereby the sample tube 11 can be inserted into the cavity 6 through these stacks. The apertures in the top and bottom of waveguide 23 and the stacks 44 and 45 are positioned so that the sample inserted therein will be placed in the cavity 6 at the region of maximum oscillating microwave magnetic field, this region of maximum magnetic field being selected at an electrical field node. The outward ends of stacks 44 and 45 are threaded to receive a hollow, cylindrical, brass collet nut 46, and within collet nut 46 is positioned a deformable hollow, cylindrical collet chuck 47 as of, for example, Teflon whereby the collet chuck 47 will be deformably squeezed about a tube passing through the stacks when its collet nut 46 is threadably tightened on either of stacks 44 and 45. The stacks 44 and 45 are made waveguides with a cutoff frequency beyond the frequency of the cavity resonator even when the stacks 44 and 45 are loaded with the sample temperature controlling means thereby minimizing the loss of microwave energy through the holes through which the sample tube and temperature controlling means are inserted.

Positioned on the bottom of cavity 6 by cap screws threaded into tapped holes in the bottom of flanges 24 and 25 is a brass adaptor plate 48 with an aperture therethrough whose diameter is considerably larger than the outside diameter of lower stack 45 which projects therethrough, the aperture in the adapter plate 48 being threaded to receive the Dewar housing 9 described in detail below.

A brass cover plate 49 which is placed against the front flange 24 covering the end of waveguide 23 is cut through with a number of closely spaced cuts providing a row of horizontal bars 51 extending across the width of the end of waveguide 23. A rectangular plate 52 abutting the front side of cover plate 49 and hollowed out around the bars 51 is screwed to the front flange 24 to hold the cover plate 49 in place. The spaces between the bars 51 provide access to the inside of waveguide 23 for the irradiation source 21. The bars 51 are parallel to the lines of current flow within cavity 6 and permit approximately 50% light transmission with negligible loss of microwave energy. Nevertheless, an extremely small amount of microwave energy is radiated from within cavity 6 through the spaces between the bars 51 and reradiated back into it from its surroundings. If the spaces between the bars are not being used for irradiation, this effect can be eliminated by putting a solid cover plate over the cover plate 49, and if the effect of motion of the surroundings during an experiment is bothersome while irradiation is being performed, it may be eliminated by a brass, baffle cover guard 53. The baffled cover guard 53 comprises a rectangular waveguide 54 projecting from around the bars 51 and subdivided into a number of open ended chambers by horizontal baffles 55, each of the chambers being a waveguide with a cutoff frequency beyond the frequency of the cavity resonator thereby preventing propagation of the energy radiated outwardly from the cavity. The baffled cover guard 53 is attached to cavity 6 by means of screws which pass through holes in a flange 56 projecting outwardly from the waveguide 54 and which thread into tapped holes in the plate 52. The baffled cover guard 53 could also be made up of a cylindrical waveguide subdivided into chambers each of which has a cutoff frequency beyond the frequency of the resonator.

Thus, the actual cavity shell within which resonance occurs consists of the waveguide 23 and the side walls 26 and is shorted at the front end by cover plate 49 and at the back end by the coupling assembly plate 35. The cavity 6 could, however, be cylindrical but the rectangular shape will more easily accommodate the apparatus associated with the cavity illustrated here and is more easily fabricated. These members which make up the cavity shell within which resonance occurs are plated on their interior surfaces with a layer of up to several skin depths of a diamagnetic material with a low resistivity as, for example, silver, copper or gold to provide the cavity resonator with a high Q typically on the order of 6000 to 8000. These materials all have a resistivity in the range of 1.6–2.5 microhm-cm. and are all diamagnetic. More than just several skin depths of this material will not appreciably increase the Q of the cavity resonator and on the other hand will provide sufficient thickness whereby eddy currents will tend to buck out the magnetic field of the sweep coils 31. If silver or copper is used for this layer of low-resistive material, a very thin flash of gold can be applied over the plated surface to prevent excessive tarnishing.

All of the metal parts of the cavity 6 and associated apparatus described herein are made of a material such as aluminum or brass which is non-magnetic and can be positioned in a strong magnetic field without disturbing the field lines.

The side walls 26 are made of a material with a high resistivity in order to prevent eddy currents in the sides of cavity 6 due to the modulating sweep field. Also, when these walls are made of ceramic or glass, they do not affect the microwave magnetic fields within the cavity 6 since ceramic and glass are diamagnetic. Materials such as glass and ceramic are also especially desirable materials for the side walls 26 since they are structurally strong and thus help in providing a rugged cavity. Glass and ceramic have a resistivity on the order from $1 \times 10^{11}$ to $1 \times 10^{16}$ ohm-cm. at room temperature. If either glass or ceramic is used for the side walls 26, these side walls 26 can be provided with an extremely thin metal coating as of, for example, platinum whereby the interior surfaces of these side walls can be more easily plated with the layer of the diamagnetic material of low resistivity. Alumina has been found to be a good material to use for the side walls because of its strength and coherence with metal platings.

The Dewar housing 9 of, for example, aluminum provides means for positioning the Dewar tube structure 8 and includes a hollow cylindrical main body portion 57 provided with a longitudinal slot extending from one end thereof, a hollow cylindrical main body extension 58 extending from the other end thereof, and an outwardly threaded adapter ring 59 slidably encircling the main body extension 58 and contained thereon by a flange on the free end thereof whereby the Dewar housing 9 is connected to the cavity 6 by threaded engagement between the adapter ring 59 and the adapter plate 48. A washer 61 of, for example, aluminum is press fit within the aperture in the adapter plate 48 and provides rigid support between the main body extension 58, and the cavity 6. A T portion 62 provides means for coupling the transfer tube 12 to the Dewar housing 9, the top of the T being a hollow cylinder 63 which slidably encircles the main body portion 57 and the base of the T being a hollow cylinder 64 provided with a slot longitudinally therethrough that matches the slot in main body portion 57. An inwardly threaded cap 65 with an aperture through the bottom thereof is adapted to be threaded onto the slotted end of main body portion 57 and to bear against the T 62 to move the top 63 of the T longitudinally of the main body portion 57 as the cap 65 is threadedly advanced on main body portion 57. A guide pin 66 projects through the top 63 of the T into a longitudinal recess 66a in the outer surface of the main body portion 57 for keeping the slot in the base 64 of the T aligned with the slot in the main body portion 57.

The Dewar tube structure 8 comprises inner and outer concentric quartz tubes, 67 and 68 respectively, and a double walled stub portion 69 projects perpendicularly from the tubes 67 and 68 near their lower extremity and communicates with the inner tube 67, the space between the inner tube 67 and the outer tube 68 serving as a sealed evacuated insulating space. The outer tube 68 has an enlarged diameter near the lower portion of the Dewar tube structure 8, and the transition 71 at which the outer tube 68 narrows down so that it can fit within stacks 44 and 45 and be held by the collet chuck 47 provides a shoulder by which the Dewar tube structure 8 can be positioned within Dewar housing 9. The inner tube 67 is provided with beads 72 on its inner wall at the desired place to position the sample tube 11 therein.

The Dewar structure 8 is made of quartz instead of Pyrex since quartz eliminates the undesirable features of dielectric loss and background signal associated with Pyrex, and quartz will transmit ultraviolet light without suffering ultraviolet damage that would be occasioned in Pyrex.

An inwardly tapered annular gasket 73 as of, for example, Teflon slidably fits within the main body extension 57 of the Dewar housing 9 with an inside diameter large enough to fit over the narrow portion of outer tube 68 and with the tapered portion adapted to bear against the transition 71 of the outer tube 68. A helical compression spring 74 is positioned between the gasket 73 and an inwardly projecting flange on the end of the main body extension 58 for resiliently mounting the Dewar tube structure 8 when it is positioned within the Dewar housing 9. A cylindrical capped plug holder 75 as of, for example, Teflon has a central bore partially therethrough, the bore having an enlarged diameter near the open end of the plug holder 75. The portion of the plug holder 75 near its capped end has a reduced outside diameter that fits through the aperture in the cap 65, and the plug holder 75 is held within the cap 65 by a metallic snap ring 76 which fits in an annular recess in the reduced portion of plug holder 75. The edge of the open end of plug holder 75 is beveled to bear against the lower end of Dewar tube structure 8. A plug 77 of, for example, glass has a ground portion adapted to fit within the open lower end of inner tube 67 and has a head portion slidably fitting within the enlarged part of the bore within the plug holder 75. A helical spring 78 is positioned with one end thereof against the head of plug 77 and the other end thereof against the capped end of the plug holder 75 within the bore therein for resiliently positioning the plug 77 in the open lower end of inner tube 67. Apertures through the capped end of the plug holder 75 and through the plug 77 provide access into inner tube 67 for the thermocouple wire 18.

The Dewar tube structure 8 is inserted within the Dewar housing 9 from the bottom thereof with the stub 69 positioned in the slots in main body portion 57 and the base 64 of the T 62, and the narrow portion of the Dewar tube structure 8 is passed through the funnel shaped gasket 73 and stacks 44 and 45. The cap 65 is then screwed on the bottom of the main body portion 58 far enough to position the beads 72 in the center of cavity 6. The sample tube 11 is inserted into the top of the Dewar tube structure 8 and positioned in the center of cavity 6 within the inner tube 67 by beads 72.

The transfer tube 12 meets the Dewar tube structure in a ball and socket joint. An annular ridge projects from the outside wall of the transfer tube 17 adjacent to the ball and socket joint, and a helical compression spring 79 is positioned between this annular ridge and a hollow cylindrical locking ring 81 surrounding the transfer tube, the locking ring 81 and the base 64 of the T 62 providing a bayonet coupling for holding the transfer tube 12 to the Dewar tube structure 8.

Referring now to FIG. 6 there is shown apparatus for for maintaining a sample of material for analysis at a fixed temperature for a considerable length of time. A hollow cylindrical, quartz, double-walled Dewar tube 82 is closed at one end with the outer wall extending beyond the end of the inner wall. The outside diameter of the lower end of the Dewar tube 82 is adapted to fit within cavity stacks 44 and 45 and be clamped in place by a collet nut 46 and a collet chuck 47 placed on the end of each stack. The upper portion of the Dewar tube 82 is expanded to a larger inside diameter for containing a refrigerating liquid as, for example, liquid nitrogen. The Dewar tube 82 is positioned within stacks 44 and 45 so that the end of the inner wall of Dewar tube 82 is positioned approximately at the center of the cavity 6 whereby the sample tube 11 can be inserted within Dewar tube 82 with the end of the sample tube 11 resting at the end of the inside wall of Dewar tube 82. The Dewar tube 82 can then be filled with the refrigerating liquid which will then surround and refrigerate the sample tube 11 held in Dewar tube 82.

In order to fabricate a cavity resonator which arrests eddy currents which tend to buck out the modulating magnetic field of the sweep coils, either the entire cavity resonator shell or just the side walls 26 shown in FIGS. 2 and 3 can be made of a structurally strong material with a high resistivity. As pointed out in the above embodiment of the present invention glass or ceramic, both of which are diamagnetic, can be used to produce an extremely sensitive electron paramagnetic resonance study cavity. However, it may be desirable to construct an all metallic cavity in certain instances where extreme shock might shatter the glass or ceramic.

Most structurally strong metals with high resistivities are characterized by paramagnetic properties which are undesirable for use in an electron paramagnetic resonance study cavity. Such materials which exhibit a high static susceptibility as, for example, "Nichrome" and "Invar" harmfully effect the homogeneity of the magnetic field in which the sample must be positioned, and materials as, for example, stainless steel, German silver, and manganese copper which have a magnetic resonance susceptibility produce background signals which are picked up in an electron paramagnetic resonance experiment.

In order to shield the microwave magnetic fields within the cavity from the paramagnetic effects of such materials the layer of diamagnetic material with low resistivity which is plated on the interior surface of the cavity resonator would have to be of such thickness that the modulating magnetic field of the sweep coils would be substantially impaired. As a further embodiment of the present invention walls of such high resistive materials as stainless steel, German silver and manganese copper which have resistivities on the order of about 80, 33 and 100 microhms-cm. respectively can be used when first plated on their inwardly directed surface with a layer of highly resistive non-ferromagnetic material as, for example, tin, platinum, palladium, lead or bismuth before plating with the layer of low resistive material, thereby providing the resonator with a high Q and protecting the microwave magnetic field from the para-magnetic resonator walls without substantially reducing the modulating magnetic field.

The strength of a modulating magnetic field is reduced by a layer of metal through which it must pass by a factor F which is roughly determined from the equation $$F = \frac{t \times d}{E^2}$$

where $t$ is the thickness of the metal, $d$ is a characteristic transverse dimension of the cavity and E is the microwave skin depth of the metal at the frequency of the sweep field. Since the microwave skin depth of a material is determined from the formula $$E = 5,033 \sqrt{\frac{P}{\mu f}}$$

where P is the specific resistivity in ohms/cm.$^3$, $\mu$ is the permeability of the conductor and $f$ is the frequency in cycles, advantage is here taken in this embodiment of the present invention of the fact that the factor F varies inversely with resistivity while the microwave skin depth varies as the square root of resistivity. Thus, by selecting a non-ferromagnetic material with a resistivity much greater than that of the diamagnetic material for plating on the paramagnet cavity resonator walls underneath the layer of diamagnetic material, a greater number of skin depths of metal exist for providing the resonator with a high Q and protecting the microwave magnetic field from the paramagnetic shell without substantially reducing the strength of the modulating magnetic field.

It should be clearly pointed out that penetration of a high frequency modulating sweep field does not depend on whether or not the skin depth of the wall material at the high frequency is greater than or less than the thickness of the wall material. Skin depth relates to the propagation of a transverse magnetic field into a metallic layer. The problem in the present instance is that of penetration of a longitudinal magnetic field through a metallic layer. The above equation for F is derived by considering the side wall of a cavity as a shorted turn around the sweep field that is penetrating it. The equation results from an analysis of the circuit parameters of this shorted turn.

By way of example, the shell of a cavity resonator can be made of 0.015 inch stainless steel which has a resistivity approximately sixty-five times that of silver whereby eddy currents are substantially entirely eliminated in the resonator walls. To provide the resonator with the customary high Q a 0.0001 inch layer of silver plated on the interior surface of the stainless steel shell would be required. An even thicker layer of silver would be required to shield the microwave magnetic field within the cavity resonator from the paramagnetic effects of the stainless steel shell. Furthermore, in practice, a thicker layer of material than the minimum required must be plated on the interior surface of the shell since it is difficult to plate the corners of the shell, and the corners are regions of maximum microwave magnetic field. Thus, the layer of silver that would ultimately have to be applied would reduce the modulating magnetic field a detrimental amount. Therefore, a 0.0007 inch layer of such materials as tin, platinum and palladium can be plated over the interior surface of the stainless steel shell, thereby providing over ten skin depths at the typical microwave operating frequency of 9.5 kmc. without substantially impeding the modulating magnetic field. These materials have a resistivity of approximately seven times that of silver and are only slightly paramagnetic. With a microwave frequency of 9.5 kmc. lead which has a resistivity approximately fourteen times that of silver will provide fifteen skin depths with a layer of 0.0015 inch, while bismuth with a resistivity approximately seventy-three times that of silver will provide thirty-five skin depths with a layer of 0.008 inch without substantially impeding the modulating magnetic field. Both lead and bismuth are diamagnetic. Over this layer of high resistivity material a 0.0001 inch layer of silver is plated to provide the cavity with the customary high Q. Over the layer of silver is plated the thin layer of gold to prevent excessive tarnishing.

As a further embodiment of the present invention, a rotating sweep field is employed whereby the component of the sweep field along the direction of the magnet axis will always remain a constant magnitude. This rotating sweep field can be accomplished by using two sweep coils with their axes at right angles to each other and driven 90° out of phase with each other. When doing this one would want to adjust the phase of the reference channel to the phase detector as the magnet is rotated.

Referring now to FIGS. 7 to 10 a cylindrical cavity resonator 83 operating in, for example, the $TE_{011}$ mode is vertically positioned between the pole pieces 84 and 85 of an electromagnet. The cavity resonator 83 comprises a hollow cylindrical shell 86 of, for example, brass closed at its two ends by a top and a bottom circular plate, 87 and 88 respectively. A ridged waveguide 91 with a coupling flange 92 on one end thereof is coupled to a flange 93 which surrounds a coupling opening 89 in the top of the cavity for propagating microwave energy into the cavity resonator. For simplicity's sake, the coupling rod assembly described in detail above is not illustrated on this cavity. The ridged waveguide is employed in order to conserve space on the top 87 of the cavity in order that the sample can be inserted axially into the cavity resonator 83.

An upper and lower stack, 94 and 95, respectively, project axially outwardly from the top 87 and the bottom 88, respectively. These stacks are waveguide beyond cutoff similar to stacks 44 and 45 described above, and each are adapted for mounting a collet nut 46 for supporting tubular structure inserted axially into the cavity. Both the variable temperature Dewar tube structure 8 and the fixed temperature Dewar tube 82, described in detail above, can be supported by the stacks 94 and 95 on the cavity 83. A number of holes at two positions on each of two mutually perpendicular diameters of the top 87 and the bottom 88 are provided whereby sweep coils can be passed through the holes on each diameter and passed vertically through the cavity resonator 83 to similar sets of holes on a diameter on the bottom 88. The turns of a sweep coil 96 pass through the holes on one of the mutually perpendicular diameters on both the top 87 and the bottom 88 and the turns of another sweep coil 97 pass through the holes on the other providing the cavity resonator 83 with two sweep coils whose axes are mutually perpendicular. By operating these two sweep coils 90° out of phase, a rotating sweep field can be provided. The sweep coils must be kept vertically aligned within the cavity or the Q of the cavity will suffer. Therefore, the sweep coils may necessarily be limited to a small number of turns. The interior surface of the cavity is plated with a layer of material with a low resistivity as, for example, silver to provide the cavity with the high Q described above. Horizontal slots 90 parallel to the lines of current flow in the walls of the cavity 83 can be provided whereby the sample can be irradiated in the manner described above.

Referring now to FIG. 9, as an alternative to the structure of FIG. 8, metallic tubes 98 pass vertically through the cavity resonator 83 and are soldered within apertures in the top 87' and bottom 88' of the cavity where the sweep coils pass through the cavity. By this construction, many more turns of wire may be used for the sweep coils which will pass through the cavity within the tubes 98 and the Q of the cavity will not be effected if the turns are not exactly vertically aligned within these tubes 98. In order to provide strength to the cavity and prevent eddy currents which would tend to buck out the sweep field, tubes 98 are made of a material with a high resistivity as, for example, stainless steel, German silver, or manganese copper. When using this construction the surfaces of these materials which lie within the cavity in which resonance occurs are plated with a thin layer of nonferromagnetic material with a high resistivity and then with a layer of a diamagnetic material with a low resistivity as fully described above.

Referring now to FIG. 10, as still another alternative to the structure of FIG. 8, tubes 99, of structurally strong diamagnetic material with a very high resistivity as for example, glass or ceramic metalized on its outwardly directed surface pass vertically through the cavity resonator 63 and through holes in the top and bottom of the cavity. In order to avoid difficulties of differences in thermal expansions and to provide good electrical contact between these tubes 99 and the top and bottom of the cavity, the tubes may be surrounded by a conducting diamagnetic wool 100 or the conducting diamagnetic gasket of, for example, silver as illustrated above.

Referring now to FIG. 11, the two sweep coils 102 and 103 with their axes mutually perpendicular can be arranged outside the walls of a cylindrical cavity resonator 101. In such a case in order to prevent eddy currents from bucking out the sweep field the cavity walls can be made of stainless steel, manganese copper, or German silver plated internally as set forth above.

The rotating sweep field could be provided on other than cylindrical cavity resonators but the cylindrical shape will most easily accommodate sweep coils with mutually perpendicular axes.

Since many changes could be made in the above construction and many apparently widely different embodiments of this invention could be made without departing from the scope thereof, it is intended that all matter contained in the above description or shown in the accompanying drawings shall be interpreted as illustrated and not in a limiting sense.

What is claimed is:

1. Cavity resonator apparatus for use in a gyromagnetic resonance spectrometer device employing sweep coils for modulating a strong magnetic field directed through the cavity resonator comprising:

a main body structure providing boundary surfaces forming a cavity resonator and including walls of a material with a high resistivity on the sides of the cavity resonator at which the sweep coils are positioned, said main body structure provided with a coupling opening for directing microwave energy into the cavity resonator, at least said boundary surfaces other than said walls of high resistivity material being metallic and adapted for mounting cavity resonator accessory apparatus thereon;

a layer of up to several skin depths of a diamagnetic material with a low resistivity covering the interior surface of said boundary surfaces;

sweep coils positioned on said cavity resonator apparatus with the axes of said coils substantially perpendicular to said walls; and means for positioning a sample of matter within the cavity resonator whereby cavity resonator accessories can be mounted on and make electrical contact with at least said boundary surfaces other than said walls, said walls arrest eddy currents therein due to the modulating magnetic field of the sweep coils, and said layer of diamagnetic material with a low resistivity provides the cavity resonator with a high Q and shields microwave magnetic fields created within the cavity resonator from the effects of any magnetic material other than a sample placed therewithin.

2. The cavity resonator apparatus of claim 1 characterized further in that said walls are detachably mounted on the remainder of said main body structure and corrugated diamagnetic gaskets provide electrical contact between said walls and the remainder of said main body structure.

3. The cavity resonator apparatus of claim 1 characterized further in that said walls are ceramic detachably mounted on the remainder of said main body structure and metalized on their interior surface for applying said layer of diamagnetic material thereto and corrugated diamagnetic gaskets provide electrical contact between said ceramic walls and the remainder of said main body structure.

4. The cavity resonator apparatus of claim 1 characterized further in that said walls are paramagnetic material detachably mounted on the remainder of said main body structure and plated on the interior surface thereof with a layer of resistive nonferromagnetic material of such depth that the strength of the external modulating magnetic field is not substantially reduced thereby and corrugated diamagnetic gaskets provide electrical contact between said walls and the remainder of said main body structure.

5. The cavity resonator apparatus of claim 1 characterized further in that said main body structure is a thin metallic shell of paramagnetic material plated on the interior surface thereof with a layer of resistive nonferromagnetic material of such depth that the strength of the modulating magnetic field is not substantially reduced thereby.

6. The cavity resonator apparatus of claim 5 wherein said shell is approximately 0.015 inch stainless steel the interior surface of which is plated with approximately 0.0007 inch of tin and said diamagnetic metal with a low resistivity is silver approximately 0.0001 inch thick.

7. The cavity resonator apparatus of claim 1 including a non-contacting coupling rod assembly for optimizing the coupling of microwave energy into the cavity resonator, said coupling rod assembly including a block of dielectric material adapted to slide across the coupling opening, a coupling rod embedded in said block and aligned transversely of the coupling opening and actuating means for moving said block and thus said coupling rod across the coupling opening.

8. The cavity resonator apparatus of claim 1 wherein one of the cavity boundary surfaces of said main body structure comprises a demountable metallic plate provided with a plurality of spaced slots aligned parallel to the path of current flow within the cavity resonator providing access to the cavity and adapted to receive means for covering the slots in said plate whereby a sample under analysis within the cavity resonator can be irradiated by a light source outside the cavity resonator without dissipating energy from a microwave field within the cavity resonator and said slots can be covered when not in use.

9. The cavity resonator apparatus of claim 8 including waveguide means projecting outwardly from around said spaced bars and subdivided into a plurality of open ended chambers, each such chamber communicating with the interior of the cavity resonator through a number of spaces between said bars and each such chamber having a cut-off frequency beyond the frequency of the cavity resonator.

10. The cavity resonator apparatus of claim 1 wherein said means for positioning a sample of matter within the cavity resonator includes sample supporting waveguide means on said main body structure and into which the cavity opens, said waveguide means having a cut-off frequency beyond the frequency of the cavity resonator thereby preventing loss of microwave energy from said cavity resonator through said sample supporting waveguide means.

11. The cavity resonator apparatus of claim 10 including: a first tube adapted to contain a sample of matter; and a second tube with a mounting portion adapted for mounting within said sample supporting waveguide means, said second tube being adapted to hold said first tube therewithin for positioning the sample at the region of maximum magnetic field within the cavity resonator and adapted to contain a flowing fluid therein surrounding said first tube whereby the sample can be positioned within the cavity resonator and the temperature thereof controlled by the temperature of said flowing fluid contained by said second tube.

12. The apparatus of claim 1 including waveguide means for propagating microwave energy into said cavity resonator through the coupling opening and means for introducing a slow flow of dry gas into said waveguide means and thus into said cavity resonator thereby preventing moisture condensation therein during low temperature operation of the spectrometer device.

13. Cavity resonator apparatus for use in a gyromagnetic resonance spectrometer employing sweep coils for modulating a strong magnetic field directed through the cavity resonator comprising:

walls of a material with a high resistivity on the sides of a cavity resonator through which the external magnetic field is directed;

a metallic diamagnetic main body assembly providing all the cavity resonater boundaries other than said walls, said main body assembly provided with a coupling opening for directing microwave energy into the cavity resonator;

means for detachably mounting said walls on said main body assembly;

a layer of up to several skin depths of a diamagnetic material with a low resistivity covering the interior surfaces of said main body assembly and said walls corrugated diamagnetic metallic gaskets positioned between said walls and said main body assembly for providing electrical contact therebetween; and means for positioning a sample of matter within the cavity resonator whereby the microwave magnetic field within the cavity resonator is shielded from the effects of magnetic material other than a sample placed therewithin and the cavity resonator is provided with a high Q while eddy currents are arrested in the detachable cavity resonator walls.

14. The cavity resonator apparatus of claim 13 wherein said walls are ceramic and both said layer of diamagnetic material and said gaskets are silver.

15. Cavity resonator apparatus for use in a gyromagnetic resonance spectrometer device comprising a cavity resonator with means for mounting tubular structure therein; a sample tube adapted to contain a sample of matter; a hollow double cylinder tube structure with a mounting portion thereof adapted for mounting within said cavity resonator with the two ends of said tube structure protruding out opposite sides of said cavity resonator, said structure including an insulating space between the cylinders and means for supporting said sample tube concentrically within the inner cylinder tube, said structure adapted to receive a portion of said sample tube in the first end of the inner cylinder tube of said structure and for directing a flowing fluid in the second end of the inner cylinder tube of said structure, around said sample tube and out the first end in which said sample tube is inserted whereby said mounting portion of said structure can be mounted in said cavity resonator with the sample positioned therewithin in the region of maximum magnetic field and the temperature of the sample can be accurately controlled by the flowing fluid.

16. The apparatus of claim 15 wherein at the second end of said tube structure a double walled stub portion adapted for directing a flowing fluid thereinto projects perpendicularly therefrom, the inner cylinder tube of said stub portion communicating with the inner cylinder tube of said tube structure, and with means for controlling the temperature of the flowing fluid directed into the inner cylinder tube of said structure including a hollow double cylinder transfer tube having an insulating space between the cylinders, one end of said transfer tube being adapted for connection with the inner tube of said stub portion, a heating element positioned within the other end of said transfer tube, a heat exchanger adapted for connecting to said other end of said transfer tube and means positioned at the second end of said tube structure for determining the temperature of the flowing fluid whereby the flowing fluid can be introduced into said heat exchanger and passed through said transfer tube into said structure whereby the temperature of the flowing fluid can be regulated by said heat exchanger and said transfer tube and the sample thereby maintained at a desired temperature level over a wide temperature range.

17. Cavity resonator apparatus for use in a gyromagnetic resonance spectrometer device employing sweep coils for modulating a strong magnetic field directed through the cavity resonator comprising:
   a metallic non-magnetic main body structure which includes the top and bottom boundary walls of the cavity and provides support for the other boundary walls;
   side walls of a material with a high resistivity detachably mounted on the sides of said main body structure and through which the modulating magnetic field of the sweep coils passes;
   corrugated diamagnetic gaskets between said main body structure and said side walls for providing electrical contact therebetween;
   a first end wall for the cavity mounted on said main body structure and with a coupling opening therethrough having adjustable coupling means for directing microwave energy into the cavity;
   a second end wall for the cavity mounted on said main body structure and provided with a plurality of spaced bars aligned parallel to the paths of current flow within the cavity resonator providing access to the cavity through the spaces between said bars;
   a layer of up to several skin depths of a diamagnetic metal, with a low resistivity covering the interior surfaces of said main body structure, said side walls and said first and second end walls;
   a non-contacting coupling rod assembly for optimizing the coupling of microwave energy into the cavity resonator including a block of dielectric material adapted to slide across the coupling opening, a coupling rod embedded in said block and aligned transversely of the coupling opening and actuating means for moving said block and thus said coupling rod across the coupling opening;
   waveguide means projecting outwardly from around the bars of said second end wall and subdivided into a plurality of open ended chambers, each such chamber communicating with the interior of the resonator apparatus through a number of spaces between bars and each such chamber having a cut-off frequency beyond the frequency of the cavity resonator;
   sample supporting waveguide means on the top and bottom of said main body structure and into which the cavity opens for positioning a sample within the cavity, said waveguide means having a cut-off frequency beyond the frequency of the cavity resonator;
   a first tube adapted to contain a sample of matter; and
   a second tube with a mounting portion adapted for mounting within said sample supporting waveguide means, said second tube being adapted to hold said first tube therewithin for positioning the sample at the region of maximum magnetic field within the cavity resonator and adapted to contain a fluid therein surrounding said first tube
whereby the sample can be positioned within the cavity resonator and the temperature thereof controlled by the temperature of the fluid contained by said second tube.

18. Cavity resonator apparatus for use in a gyromagnetic resonance spectrometer device employing sweep coils for modulating a strong magnetic field directed through the cavity resonator comprising: a metallic main body structure providing boundary surfaces forming a cavity resonator and provided with thin side walls of paramagnetic metal on the sides of the cavity through which the modulated magnetic field passes, the interior surface of said side walls being plated with a layer of resistive nonferromagnetic material of such depth that the strength of the modulated magnetic field is not substantially reduced thereby, said main body structure provided with a coupling opening for directing microwave energy into the cavity resonator; a layer of up to several skin depths of a diamagnetic material with a low resistivity covering the interior surface of said boundary surfaces; and means for positioning a sample of matter within the cavity resonator whereby said side walls and said layer of resistive nonferromagnetic material arrest eddy currents therein due to the modulated magnetic field and said layer of diamagnetic material with a low resistivity provides the cavity resonator with a high Q and shields the microwave magnetic field created within the cavity resonator from the effects of any magnetic material other than the sample placed therewithin.

19. The cavity resonator apparatus of claim 18 wherein said side walls are approximately 0.015" stainless steel the interior surface of which is plated with approximately 0.0007" of tin and said diamagnetic metal with a low resistivity is silver approximately 0.0001" thick.

References Cited in the file of this patent

UNITED STATES PATENTS

| 2,836,722 | Dicke et al. | May 27, 1958 |
| 2,864,995 | Shoolery | Dec. 16, 1958 |

FOREIGN PATENTS

| 150,336 | Australia | Feb. 27, 1953 |

OTHER REFERENCES

Fujimoto et al.: Transactions of the Faraday Society, vol. 54, No. 9, September 1958, pp. 1304 to 1315.

Pipkin et al.: Physical Review, vol. 109, No. 5, March 1958, pp. 1423 to 1458.

Bennett et al.: Review of Scientific Instruments, vol. 29, No. 7, July 1958, pp. 659 and 660.

Mulay et al.: Review of Scientific Instruments, vol. 28, No. 4, April 1957, pp. 279 to 282.

Dillon et al.: The Review of Scientific Instruments, vol. 30, No. 37, July 1959, pp. 559–561 incl.

Bernstein et al.: Proceedings of the Royal Society, London, vol. 236, No. 1207, Sept. 11, 1956, pp. 515 to 528 incl.

Manus et al.: Academie Des Sciences, Comptes Rendus, vol. 239, No. 5, August 1954, pp. 414 and 415.